Oct. 24, 1933.  C. L. BURDICK  1,932,012
HYGROMETRIC APPARATUS
Filed April 25, 1932
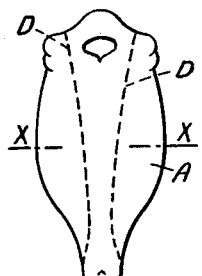
FIG. 1.
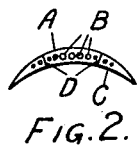
FIG. 2.
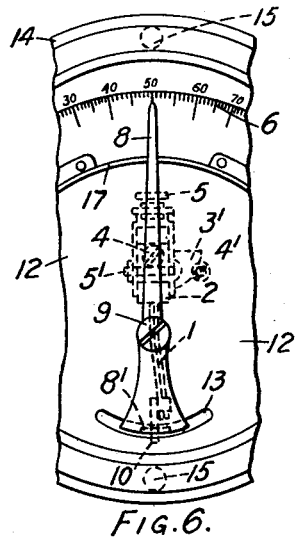
FIG. 6.
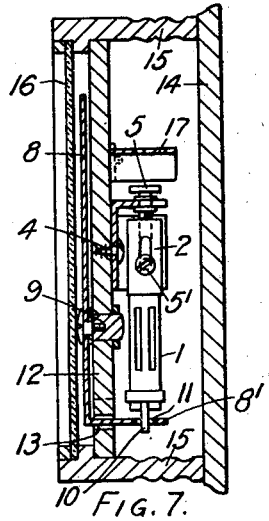
FIG. 7.
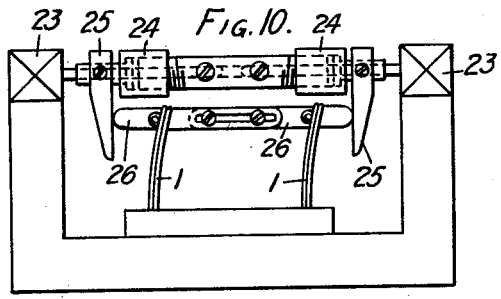
FIG. 10.   FIG. 11.
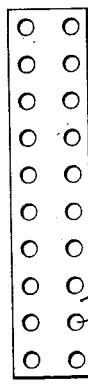
FIG. 12.
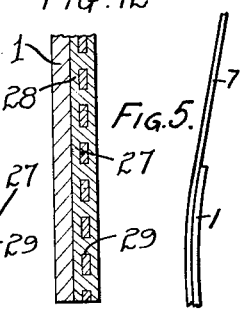
FIG. 5.   FIG. 4.
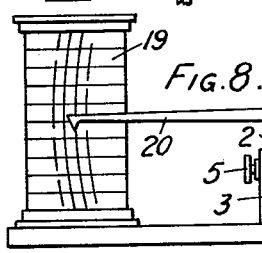
FIG. 8.
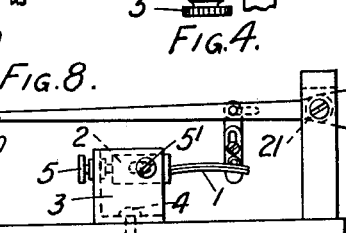
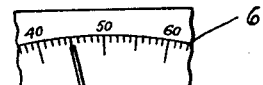
FIG. 3.
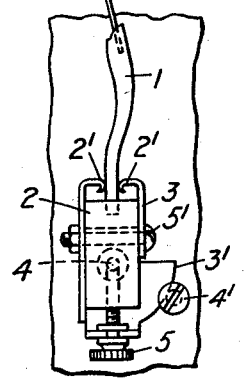
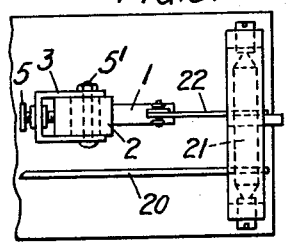
FIG. 9.
INVENTOR.
Charles L. Burdick
By Owen & Owen
Attorneys Patented Oct. 24, 1933

1,932,012

UNITED STATES PATENT OFFICE 1,932,012

HYGROMETRIC APPARATUS

Charles Laurence Burdick, London, England

Application April 25, 1932, Serial No. 607,359, and in Great Britain September 16, 1931

12 Claims. (Cl. 73—24)

My invention relates to hygrometric apparatus or instruments effected by the humidity of air or other gases; in the carrying out my invention I utilize preferably the ovular bracts or scales, or parts of such bracts, from conifer trees which move naturally in response to varying conditions of humidity in the atmosphere.

The bracts of cones, of which there are many types, have a general construction in which there is an outer sheath of fibre which swells with the absorption of moisture; running longitudinally through the central portion of the bract are a number of cords of fibre almost or quite impervious to moisture, an inner sheath apparently serves as an ovular covering and is but little affected by moisture.

When much moisture is present the outer covering swells, the inner cords remaining of the same length the free end of the bracts turn inward and as we say "the cone closes up", when the bract is drying out the movement is reversed, the outer covering contracts and the outer ends curve outward.

There are many organic substances both vegetable and animal tissues which absorb moisture readily and can be made to serve as a hygrostatic element, the advantage of the moisture absorbing fibre from the cone bract is its rigidity and its resistance to various forms of deterioration common to most absorbent tissues.

I do not confine my invention to the utilization of cone bracts, the mechanical arrangement may be used with other forms of moisture sensitive substances.

My invention consists in utilizing and improving upon this natural phenomenon in the production of hygrometrical apparatus.

And further in the mechanical mounting and arrangements of parts whereby hygrostatic movement is amplified and made effective.

When using the bracts themselves I trim them in such a way as to improve upon their natural effective movement.

The bracts in closing up not only move towards the axis of the cone at their free ends but the side wings of the bracts tend to curve inward to the circumferential shape of the closed cone, this curvature in the cross section of the bract has a retarding action; by trimming away the wings and retaining only the central longitudinal portion of the bract a much more effective movement is obtained.

I prefer however to use only the moisture sensitive portion of the bract as a hygrostatic element replacing the cords with flexible material which may be a film of mica, celluloid, metal or other flexible substance which is preferably secured thereto by cement or painted or sprayed there on in liquid form. The hygrostatic element may be cut in strips with openings between to enable the air to more readily contact with it.

Two or more hygrostatic elements may be so mounted and linked together as to work as a single unit where more power is required; the coupling may be side by side or tandem with adjustable connections.

The calibration of the graduated scale is such as to compensate for the changes in leverage and the curvature of the bract.

In a recording hygrometer I provide the usual clock work mechanism with cylindrical support for ruled sheets of paper. Secured to a journaled or pivoted shaft a long flexible arm carrying a pen or pencil traces a graph on the paper sheets as the cylinder turns. The journaled shaft is rotated by means of a shorter arm secured thereto which is moved by being adjustably linked with a suitably mounted hygrostatic element or hygrostatic elements.

I further provide means whereby the hygrostatic elements are made to operate valves controlling the flow of liquids or gases, or which will operate "make and break" contacts for electrical current either in the form of relay apparatus or for direct control.

My invention will be understood from the following description and by reference to the accompanying drawing in which:

Figure 1 is a representation of a conifer bract. Figure 2 is a sectional view of same taken on the line x—x. Figure 3 is a partial plan view of a simple form of hygrometer. Figure 4 is a side elevation view showing a modification of same. Figure 5 is a sectional side elevation of a detail of Figure 4. Figure 6 is a plan view showing another form of construction. Figure 7 is a sectional side elevation view of same. Figure 8 is a side elevation view of a design for a recording hygrometer. Figure 9 is a partial plan view of same. Figure 10 shows a side elevation view of means for utilizing my invention for operating automatic controls. Figure 11 is a plan view of a strip which may be used for supporting the bract. Figure 12 is a longitudinal sectional view of the bract as attached to the support shown in Figure 11.

A portion of the upper or outside surface A (Fig. 1) of a cone bract such as I utilize for the development of my invention is composed of a layer of fibre which absorbs moisture quickly and swells and lengthens; a central portion B consists of strong cords anchored securely at each end of the bract and which are not readily affected by moisture; C indicates the inner lining of the bract. There is a natural movement of the end of the bract toward and away from the axis of the cone caused by changes of humidity; there is simultaneously a curvature (shown in the sectional view Fig. 2) which tends to make the side wings of the bract take the circumferential shape of the cone.

As the side wings are closing up there is a retarding influence in the movement of the free end towards the axis, to eliminate this I cut away the wings as indicated by the dotted lines D in Figures 1 and 2.

The result of this trimming is to greatly improve the effective movement caused by changes of humidity. I prefer however to cut away all but the moisture sensitive portion of fibre in the bract and utilize this in connection with a flexible support; this is illustrated in Figs. 4 and 5.

The cone bracts so prepared can be used in various mechanical arrangements for different forms of hygrometrical apparatus.

The numeral 1 in the various figures represents bracts so treated, and may also represent any moisture absorbent substance utilized in a similar mechanical way for hygrometrical apparatus.

2 is a preferably rectangular mounting or piece made of non absorbent material (such for instance as hard rubber) into which the base of the hygrostatic element is secured by an anhydrous cement. I have found plastic wood prepared with cellulose serviceable for this purpose.

This mounting is preferably secured in an adjustable holder 3 which is secured in place by and pivoted on a screw or stud 4 while a second screw 4' serves to retain it in a fixed position by being screwed down on a flange 3' of the holder 3.

The mounting 2 is adjustable in the holder by means of a set screw 5 while a second screw 5' secures the block in its position when adjusted; a slot in the block permits the movement of the block in relation to the screw 5'.

In the construction shown in Figs. 3, 4 and 5 the holder 3 is brought around at its forward end 2' so as to engage the sides of the hygrostatic element. Turning the set screw 5 will lengthen or shorten the effective movement of the hygrostatic element and the pointer.

The figure 3 shows a simple form of mounting for a hygrometer indicating the moisture in the atmosphere, the pointer 7 amplifies the movement of the bract and a calibrated and numbered index 6 shows the relative humidity.

The index may be numbered in any convenient way but preferably in percentages of 100 at saturation point. Fig. 4 shows a side elevation view of the adjustable mounting but with a hygrostatic element which may be either a fibre from a cone bract or any other moisture absorbent material secured to a flexible mounting as 7 which serves at the same time as a pointer. This is further illustrated in the front view of Fig. 5. Fig. 4 shows how the hygrostatic element may be bifurcated or cut into strips to allow for better circulation of the air.

Figures 6 and 7 show a simple and efficient form of mounting in which a pointer 8 is mounted pivotally on a post or stud 9 and is moved by an arm 10, mounted on the hygrostatic element, which falls in a slot 11 in an extension of the pointer.

The adjustable mounting is similar to that shown in Figs. 3 and 4 except that the wing pieces 2' are removed and the movement of the block 2 by the screw 5 lengthens or shortens the leverage of the pin 10 in the slot 11.

This form of construction eliminates weights or springs and reduces frictional resistance to a minimum. I mount the hygrostatic element on one side of a support 12 having an opening 13 and the pointer on the other side, so that the circular movement of the bract and the circular movement of the pointer from their respective pivotal points will synchronize and to some extent equalize the movement, any discrepancies can be met by variation of the calibration.

In this form of construction I provide a ventilated casing which may be supported on a base 14 by means of posts or spindles 15 and be provided with a glass covering 16 for the index, a shield 17 may be provided to protect the hygrostatic element.

In Figures 8 and 9 a form of recording hygrometer is indicated. The usual clock work mechanism supporting ruled sheets is represented by 19, a long spring arm 20 supports a pen for tracing a graph on the sheets; this arm is mounted on the journaled shaft 21 which is rotated by the hygrostatic element adjustably secured to the arm 22.

Figure 10 shows an arrangement for utilizing my invention to operate valves or electrical apparatus which are indicated by 23—23.

In carrying this arrangement out it is desirable to have adjustable mechanism such as is indicated by 24—25. In this figure 1 shows also how two or more hygrostatic elements may be coupled together to operate hygrometric apparatus. The pieces 26—26 which move back and forth with the movement of the bracts are adjustably coupled together in the centre by slots and set screws falling therein.

In this construction the ends of the hygrostatic element may be slotted and the pieces 26 which fall in the slot may be pierced to receive pins which are secured to the hygrostatic element.

In Figures 11 and 12, I have shown an improved means for supporting the absorbent element 1, comprising a flexible strip 27 which may be of spring metal and to which the absorbent element may be secured by anhydrous cement 28. Cellulose adheres to the absorbent fiber and is a very satisfactory cement for this purpose. There are preferably two layers of cellulose, one on each face of the strip 27. To prevent possible separation of the cellulosic material from the metal, these two layers are effectively mounted together through holes 29 formed in the flexible strip 27.

What I claim is:

1. In hygrometric apparatus, the combination with an arm comprising at least a portion of an ovular bract from a cone of a conifer tree and having one side capable of absorbing moisture from a surrounding medium and swelling to a greater degree than the opposite side, thereby causing a flexure of the arm which varies with different percentages of humidity in said medium, of means for rigidly holding one end of the arm, leaving the other end free to move as the arm flexes.

2. In hygrometric apparatus, the combination with an arm having a flexible portion comprising at least a portion of an ovular bract from a cone of a conifer tree and capable of flexing to different degrees with variations of humidty in a surrounding gaseous medium, of means for rigidly holding one end of the arm, leaving the other end free to move as the arm flexes.

3. In hygrometric apparatus, the combination with an arm having a flexible portion comprising at least a portion of an ovular bract from a cone of a conifer tree and capable of flexing to different degrees with variations of humidity in a surrounding gaseous medium, of means for rigidly holding one end of the arm, leaving the other end free to move as the arm flexes, and means cooperating with the free end of said arm to indicate the percentage of said humidity.

4. In hygrometric apparatus, the combination with an arm having one side capable of absorbing moisture from a surrounding gaseous medium and swelling to a greater degree than the opposite side, thereby causing a flexure of the arm which varies with different percentages of humidity in said medium, of means for rigidly holding one end of the arm, leaving the other end free to move as the arm flexes, a pointer on said arm, a scale cooperating with said pointer, and means for adjusting the amplitude of movement of said pointer in proportion to the flexure of said arm.

5. In hygrometric apparatus, the combination with an arm comprising at least a portion of an ovular bract from a cone of a conifer tree and having one side capable of absorbing moisture from a surrounding gaseous medium and swelling to a greater degree than the opposite side, thereby causing a flexure of the arm which varies with different percentages of humidity in said medium, of means for rigidly holding one end of the arm, leaving the other end free to move as the arm flexes, and an instrumentality controlled by arm in accordance with the flexure thereof.

6. In hygrometric apparatus, the combination with means movable in accordance with the percentage of humidity in a surrounding gaseous medium, said means including an arm formed from an ovular bract from a cone of a conifer tree and having one side capable of absorbing moisture from said medium and swelling to a greater extent than the opposite side, thereby causing a flexure thereof which varies with the moisture, and an instrumentality controlled by said means in accordance with said flexure.

7. In hygrometric apparatus, the combination with an arm having one side capable of absorbing moisture from a surrounding gaseous medium and swelling to a greater degree than the opposite side, thereby causing a flexure of the arm which varies with different percentages of humidity in said medium, of means for rigidly holding one end of the arm, leaving the other end free to move as the arm flexes, said means being adjustable to vary the proportionate movement of the free end of the arm as compared to the humidity of the surrounding medium.

8. In hygrometric apparatus, the combination with an arm having one side capable of absorbing moisture from a surrounding gaseous medium and swelling to a greater degree than the opposite side, thereby causing a flexure of the arm which varies with different percentages of humidity in said medium, of a flexible strip rigidly mounted at one end, said arm being firmly secured to and supported by said flexible strip, one end of the arm being free to move as the arm flexes.

9. In hygrometric apparatus, the combination with an arm having one side capable of absorbing moisture from a surrounding gaseous medium and swelling to a greater degree than the opposite side, thereby causing a flexure of the arm which varies with different percentages of humidity in said medium, of a flexible strip rigidly mounted at one end and supporting said arm of absorbent material, and anhydrous material securing said arm to the flexible strip, leaving one end of said arm free to move as the arm flexes.

10. In hygrometric apparatus, the combination with an arm having one side capable of absorbing moisture from a surrounding gaseous medium and swelling to a greater degree than the opposite side, thereby causing a flexure of the arm which varies with different percentages of humidity in said medium, of a flexible strip rigidly mounted at one end and having holes therethrough, layers of anhydrous material on opposite faces of said strip integrally joined through said holes, said arm of absorbent material being secured to and supported by said strip by reason of its adherence to the anhydrous material.

11. In hygrometric apparatus, an arm formed from an ovular bract from the cone of a conifer tree and rigidly supported at one end, the other end of the arm being free to move in response to variations in humidity, an indicating element, means for moving said indicating element in proportion to the movement of the free end of the bract but through a greater distance, and a graduated scale cooperatively associated with said indicating element.

12. In hygrometric apparatus, an indicating arm having a flexible portion formed from an ovular bract from a cone of a conifer tree, the lateral edge portions of said bract being trimmed off to reduce the tendency of the bract to curl laterally under the influence of moisture.

CHARLES LAURENCE BURDICK.